United States Patent [19]

Diery et al.

[11] Patent Number: 4,500,735
[45] Date of Patent: Feb. 19, 1985

[54] QUATERNARY CROSSLINKED PRODUCTS OF XYLYLENE DICHLORIDES AND TRIETHANOLAMINE CONDENSATES AND THEIR USE

[75] Inventors: Helmut Diery, Kelkheim, Fed. Rep. of Germany; Bernhard Mees, Charlotte, N.C.

[73] Assignee: Hoechst Aktiengesellschaft, Fed. Rep. of Germany

[21] Appl. No.: 467,738

[22] Filed: Feb. 18, 1983

[30] Foreign Application Priority Data

Feb. 23, 1982 [DE] Fed. Rep. of Germany ....... 3206459

[51] Int. Cl.³ ............................................. C07C 91/12
[52] U.S. Cl. .................................. 564/286; 564/296; 252/358; 252/357; 252/50
[58] Field of Search ...................... 564/286, 287, 296; 528/397; 252/50

[56] References Cited

U.S. PATENT DOCUMENTS

| | | | |
|---|---|---|---|
| 2,912,390 | 11/1959 | Jaruyelski | 528/397 |
| 3,475,518 | 10/1969 | Cantotore | 528/397 |
| 3,825,511 | 7/1974 | Markhart et al. | 528/397 |
| 3,899,534 | 8/1915 | Rembaum et al. | 528/397 |
| 3,974,220 | 8/1976 | Heib et al. | 564/286 |
| 4,016,128 | 4/1977 | Serlin et al. | 528/397 |
| 4,038,318 | 7/1977 | Tai | 564/286 |
| 4,254,255 | 3/1981 | Labach et al. | 528/397 |

Primary Examiner—James H. Reamer
Attorney, Agent, or Firm—Connolly and Hutz

[57] ABSTRACT

Quaternary crosslinked products obtained by reacting triethanolamine condensates of the formula

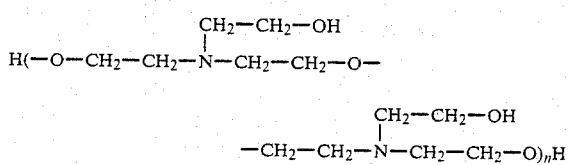

wherein n is an integer of from 1 to 3, with xylylene dichloride and their use as demulsifiers for oil-water emulsions, as lubricants and as auxiliaries in the paper industry.

3 Claims, No Drawings

QUATERNARY CROSSLINKED PRODUCTS OF XYLYLENE DICHLORIDES AND TRIETHANOLAMINE CONDENSATES AND THEIR USE

It is known to use triethanolamine successfully in formulations in the fields of detergents and of corrosion protection. It is also known that polycondensates of triethanolamine can be obtained in the presence of catalytical amounts of Lewis acids, for example $ZnCl_2$, with splitting off of water. Up to 1 mol of water split off per mol of triethanolamine a highly viscous paste is obtained, which is still soluble in water and forms likewise highly viscous solutions in water. Although the resulting viscosity is very high, the degree of condensation and the molecular weight reached are relatively low. The molecular weight reached according to this process is in the range of from 650–750. Products of this type are suitable for use in the fields of paper finishing, of mineral oil demulsification and of lubricants. The unsatisfactory low molecular weight of the triethanolamine condensates if disadvantageous, however, for said application fields. Attempts to continue the condensation to an extent exceeding 1 mol of water per 1 mol of triethanolamine result in the formation of an extremely tough gel phase, that can no longer be controlled technically and, as a result, a polycondensate completely insoluble in water is obtained.

These findings show that it is impossible technically to obtain triethanolamine condensates of higher molecular weight and better technological properties by further condensing.

It has now been found that technically valuable condensates of higher molecular weight are obtained when reacting the triethanolamine condensates with xylylene dichlorides.

Subject of the present invention, consequently, are quaternary crosslinked products obtained by reacting triethanolamine condensates of the formula

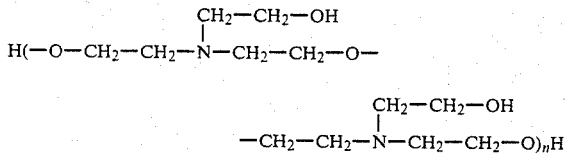

wherein n is an integer of from 1 to 3, with xylylene dichlorides.

Suitable triethanolamine condensates are products that give completely clear solutions in water. The viscosity of a 40% aqueous solution should be in the range of from 30 to 1,500 mPas, preferably of from 100 to 1,000 mPas, (measured in a falling ball viscosimeter). As to the condensation process: it is performed in known manner by acid catalysis at a temperature of from 180° to 230° C., simultaneous separation of the reaction water by distillation by means of a nitrogen current being recommended.

Suitable xylylene dichlorides are o-xylylene dichloride, p-xylylene dichloride and 2,3,5,6-tetrachloro-p-xylylene dichloride. These xylylene dichlorides are obtained in known manner by partial side chain chlorination of the corresponding xylylenes. Contrary to cross-linking processes using epoxides and isocyanates, which latter compounds react at the OH group of the triethanolamine condensate, cross-linking using xylylene dichlorides takes place at the nitrogen atom. As a result, quaternary products having quite a different activity range are obtained.

The reaction of the triethanolamine condensates with xylylene dichlorides proceeds at a temperature of from 70° to 160° C., preferably of from 80° to 120° C. It is carried out generally without a solvent, however, a suitable solvent may be used as well. The use of a solvent is advisable especially in cases where the viscosity of the reactants and of the final product in indiluted state is excessively high.

The molar ratio of triethanolamine condensate to xylylene dichloride is from about 1:0.5 to 1:0.05, the upper limit of the quantity of xylylene dichloride depending on the viscosity and, involved therewith, on the molar weight of the condensate used. The higher the molar weight of the condensate, the lower should be the quantity of dichloride added, otherwise gel-like final products that are no longer water-soluble would be obtained due to crosslinking reactions.

The xylylene dichloride used may be added during the reaction time either all at once or portionwise, of, if it is in liquid state, continuously. An additional catalyst is not required for the reaction. The reaction time depends on the reaction temperature. The reaction is continued until a titration of ionic chloride corresponds to the theoretical quantity.

The products obtained are excellently suitable as demulsifiers of natural and artificial emulsions of water and mineral oil, as lubricants of machine parts and as auxiliaries in the paper industry.

The following examples serve to illustrate the invention:

EXAMPLE 1

298 Weight parts of triethanolamine are placed in a 1 liter four-necked flask equipped with a stirrer, a thermometer and a short path distillation head together with 3 weight parts of powdered zinc chloride and the batch is heated to 230° under agitation. The reaction water formed is separated via the short-path distillation head by introducing a slight nitrogen current. The batch is allowed to react until about 35.5 g of distillate have separated (about 5 hours). The product is still water-soluble and has a viscosity of from 32 Pas at room temperature (measured directly, that is without dilution in water). To this condensate there are added portionwise under agitation 6 weight parts of p-xylylene dichloride within 1 hour at an inner temperature of 100° C. and the batch is stirred for a further one hour. When potentiometric titration of ionic chloride shows that quaternization is complete, the batch is completed with water until a 40% aqueous solution is obtained. The viscosity of this solution is from 5 to 6 Pas.

EXAMPLE 2

298 Weight parts of triethanolamine are condensed in the manner specified in Example 1, until a sample thereof in undilute state is found to have a viscosity of 66 Pas (at room temperature).

Thereafter 12 g of o-xylylene dichloride are added in the manner specified in Example 1 within 1 hour at 100° C. and the batch is stirred for a further one hour. After having assessed the chloride content, the highly viscous brown liquid is diluted with water to 40 weight %. The final product has a viscosity of from 8 to 9 Pas.

EXAMPLE 3

A triethanolamine condensate having a viscosity of 66 Pas is prepared according to Example 2. The highly viscous product is diluted with 60 weight parts of methoxybutanol and subsequently supplemented portionwise with 6 weight parts of tetrachloro-p-xylylene dichloride at 120° C., whereupon the temperature is increased to 150° C. during a further two hours. Upon complete reaction, the product is cooled to 90° C., supplemented with 100 weight parts of water and methoxybutanol is distilled off. After completing the product with water to 40 weight % there is obtained a brown liquid having a viscosity of from 8 to 9 Pas.

EXAMPLE 4

To 298 weight parts of a triethanolamine condensate according to Example 1 having a viscosity of 32 Pas there is added a mixture of 4 parts of p-xylylene dichloride and of 4 parts of o-xylylene dichloride within 1 hour at 100° C. The batch is left to react for 2 to 3 hours at 100° C. and water is added until a 40 weight % solution is reached. The resulting liquid has a viscosity of 4 Pas.

What is claimed is:

1. Quaternary crosslinked products obtained by reacting, at about 70 to about 160 degrees C., a triethanolamine condensate of the formula

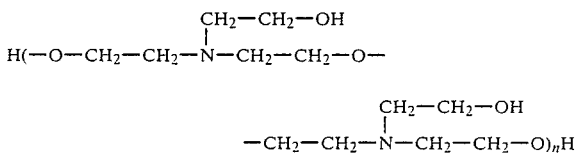

wherein n is an integer from 1 to 3, with a xylylene dichloride, the ratio of triethanolamine condensate to xylylene dichloride being from about 1:0.5 to about 1:0.05.

2. The quaternary crosslinked product of claim 1 obtained by reaction with said xylylene dichloride wherein said xylylene dichloride is o-xylylene dichloride, p-xylylene dichloride or tetrachloro-p-xylylene dichloride.

3. The quaternary crosslinked product of claim 1 obtained by reacting said condensate and said xylylene dichloride at 80 to 120 degrees C. in an essentially solvent-free reaction medium.

* * * * *